US012554888B2

(12) United States Patent
Gomez

(10) Patent No.: US 12,554,888 B2
(45) Date of Patent: Feb. 17, 2026

(54) PRIVACY-PRESERVING PROMPT ENGINEERING FOR GENERATIVE ARTIFICIAL INTELLIGENCE

(71) Applicant: SAP SE, Walldorf (DE)

(72) Inventor: Laurent Gomez, Pégomas (FR)

(73) Assignee: SAP SE, Walldorf (DE)

( * ) Notice: Subject to any disclaimer, the term of this patent is extended or adjusted under 35 U.S.C. 154(b) by 132 days.

(21) Appl. No.: 18/513,334

(22) Filed: Nov. 17, 2023

(65) Prior Publication Data

US 2025/0165648 A1  May 22, 2025

(51) Int. Cl.
*G06F 21/62* (2013.01)
*G06F 21/60* (2013.01)

(52) U.S. Cl.
CPC ........ *G06F 21/6254* (2013.01); *G06F 21/606* (2013.01); *G06F 21/6227* (2013.01)

(58) Field of Classification Search
None
See application file for complete search history.

(56) References Cited

U.S. PATENT DOCUMENTS

| 2017/0061143 | A1* | 3/2017 | Rooney | G06F 21/6263 |
| 2023/0394026 | A1* | 12/2023 | Kesarwani | G06F 16/23 |
| 2025/0085934 | A1* | 3/2025 | Kunz | G06F 11/3604 |
| 2025/0110975 | A1* | 4/2025 | Shea | G06F 16/3329 |
| 2025/0110976 | A1* | 4/2025 | Channapattan | G06F 40/205 |
| 2025/0123820 | A1* | 4/2025 | Khan | G06F 8/34 |
| 2025/0131121 | A1* | 4/2025 | Teng | G10L 15/183 |

OTHER PUBLICATIONS

Wikipedia, "Named-entity recognition," https://en.wikipedia.org/wiki/Named-entity_recognition, 7 pages (accessed Oct. 12, 2023).
Wikipedia, "Part-of-speech tagging," https://en.wikipedia.org/wiki/Part-of-speech_tagging, 5 pages (accessed Oct. 12, 2023).
Jurafsky et al., "Dependency Parsing," *Speech and Language Processing*, 27 pages, Oct. 2, 2019.
GeeksforGeeks, "What is a Large Language Model (LLM)," https://www.geeksforgeeks.org/large-language-model-llm/, 15 pages (accessed Oct. 10, 2023).
Wikipedia, "Transfer learning," https://en.wikipedia.org/wiki/Transfer_learning, 4 pages (accessed Oct. 12, 2023).

(Continued)

*Primary Examiner* — Boris D Grijalva Lobos
(74) *Attorney, Agent, or Firm* — Klarquist Sparkman, LLP

(57) ABSTRACT

Certain aspects of the disclosure concern a computer-implemented method for improved data security when interacting with a large language model. The method includes receiving a prompt query entered through a user interface, detecting sensitive data in the prompt query that violates a security protocol, generating a modified prompt query which anonymizes the sensitive data, submitting the modified prompt query to a large language model, and receiving a reply generated by the large language model. The reply contains anonymized sensitive data. The method further includes generating a modified reply which deanonymizes the anonymized sensitive data and presenting the modified reply on the user interface.

20 Claims, 24 Drawing Sheets

(56) References Cited

OTHER PUBLICATIONS

Ali, "Supervised Machine Learning," *DataCamp*, https://www.datacamp.com/blog/supervised-machine learning, 14 pages (accessed Oct. 12, 2023).

Alhamid, "Ensemble Models: What Are They and When Should You Use Them?," *Built In*, https://buildin.com/machine-learning/ensemble-model, 21 pages (accessed Oct. 12, 2023).

Wikipedia, "Active learning (machine learning)," https://en.wikipedia.org/wiki/Active_learning_(machine learning), 4 pages (accessed Oct. 12, 2023).

* cited by examiner

[Prompt]
Proof-read and improve the following sentence for clarity, and calculus error: "I can make the following offer, 10 printers for 50$, for the total amount of 600$" ← 610

| Identified information | Anonymized information |
|---|---|
| 10 | SHA-256: bfb1a9d0c64... |
| $50 | SHA-256: 0908406f051... |
| $600 | SHA-256: c73064a6ce6... |

620 ↗           ↙ 630

[(anonymized) Prompt]
Proof-read and improve the following sentence for clarity, and calculus error: "I can make the following offer, SHA-256: bfb1a9d0c64... printers for SHA-256: 0908406f051...$, for the total amount of SHA-256: c73064a6ce6...$"

640 ↙

[(anonymized) Reply]
"I can offer you a total of SHA-256: bfb1a9d0c64... printers at SHA-256: 0908406f051...$ each, which amounts to a total of $ eval(SHA-256: bfb1a9d0c64... * SHA-256: 0908406f051...)$."

[Reply]
"I can offer you a total of 10 printers at $50 each, which amounts to a total of $500." ← 650

FIG. 6 from the following information, generate an email to PrinterBrand to place a purchase order.

I am Mr John, procurement officer for BuyCorp. My home number is +1 (555) 123-4567. My email is johndoe@email.com.
I want to close a deal with a customer for the acquisition of 10 PrinterBrand printers, at the price of 50$ each, to be delivered on the 15th of July 2023.
I attach a purchase agreement and invoice for this order, encrypted with password 7dA5pRt#.
My contact at PrinterBrand is Mr Smith, sale director.

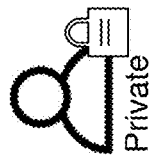

Pseudo-anonymized prompt from the following information, generate an email to ANO0001 to place a purchase order. I am ANO0002, procurement officer for ANO0003. My home number is ANO0004. My email is ANO0005. I want to close a deal with a customer for the acquisition of ANO0006 ANO0001 printers, at the price of ANO0007$ each, to be delivered on the ANO0008. I attach a purchase agreement and invoice for this order, encrypted with password ANO0009. My contact at ANO0001 is ANO0010, sale director.

FIG. 9

Anonymized GenAI reply

```
let emailTo = "ANO0001";
let emailFrom = "ANO0005";
let subject = "Purchase Order for ANO0006 ANO0001 Printers";
let body = 'Dear ANO0010,
I am ANO0002, procurement office for ANO0003. I am writing to place a purchase order for ANO0006 AN
We agree to the price of ANO0007$ each, and expect the delivery to be made on ANO0008.
I have attached a purchase agreement and an invoice for this order. Please note that these documents
Should you have any queries, please do not hesitate to contact me at my home number ANO0004 or via t
Looking forward to doing business with you.
Best regards,
ANO0002';
let email = {
    to: emailTo,
    from: emailFrom,
    subject: subject,
    body: body
};
return email;
```

FIG. 10

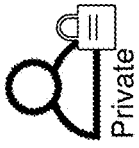

Pseudo-deanonymized GenAI reply

```
let emailTo = "PrinterBrand";
let emailFrom = "johndoe@email.com";
let subject = "Purchase Order for 10 PrinterBrand Printers";
let body = 'Dear Mr Smith,
I am Mr John, procurement office for BuyCorp. I am writing to place a purchase order for 10 Printer
We agree to the price of 50$ each, and expect the delivery to be made on 15th of July 2023.
I have attached a purchase agreement and an invoice for this order. Please note that these documents
Should you have any queries, please do not hesitate to contact me at my home number +1 {555} 123-456
Looking forward to doing business with you.
Best regards,
Mr John';
let email = {
    to: emailTo,
    from: emailFrom,
    subject: subject,
    body: body
};
return email;
```

FIG. 11

```
{
  "to": "PrinterBrand",
  "from": "johndoe@emai.com",
  "subject": "Purchase Order for 10 PrinterBrand Printers",
  "body": "Dear Mr Smith, I am Mr John, procurement officer for BuyCorp. I am writing to place a purchase order for 10 PrinterBrand printers.

We agree to the price of 50$ each, and expect the deliver to be made on 15th of July 2023.

I have attached a purchase agreement and an invoice for this order. Please note that these documents are encrypted with the password 7dA5pRt# for security purposes.

Should you have any queries, please do not hesitate to contact me at my home number +1 (555) 123-4567 or via this email address.

Looking forward to doing business with you.

Best regards,

Mr John"
}
```

FIG. 12

1200 from the following information, generate an email to PrinterBrand to place a purchase order, including the computation of global amount for this purchase order.

I am Mr John, procurement officer for BuyCorp. My home number is +1 (555) 123-4567. My email is johndoe@email.com.
I want to close a deal with a customer for the acquisition of 10 PrinterBrand printers, at the price of 50$ each, to be delivered on the 15th of July 2023.
I attach a purchase agreement and invoice for this order, encrypted with password 7dA5pRt#.
My contact at PrinterBrand is Mr Smith, sale director.

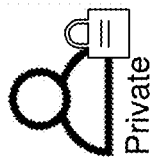

Pseudo-anonymized prompt

From the following information, generate an email to ANO0006 to place a purchase order. Including the computation of global amount for this purchase order. I am ANO0001, procurement officer for ANO0002. My home number is ANO0003. My email is ANO0004. I want to close a deal with a customer for the acquisition of ANO0007 ANO0006 printers, at the price of ANO0008$ each, to be delivered on the ANO0009. I attach a purchase agreement and invoice for this order, encrypted with password ANO0010. My contact at ANO0006 is ANO0011, sale director.

FIG. 14

Pseudo-deanonymized GenAI reply

```
let myDetails = {
    name: "Mr John",
    position: "Procurement Officer",
    company: "BuyCorp",
    homeNumber: "+1 (555) 123-4567",
    email: "johndoe@email.com"
};
let purchaseDetails ={
    product: "PrinterBrand Printers",
    quantity: "10",
    unitPrice: "50",
    deliveryDate: "15th of July 2023",
    encryptedDocs: "Purchase Agreement and Invoice",
    encryptionPass: "7dA5pR#"
};
let contactDetails = {
    company: "PrinterBrand",
    contactPerson: "Mr Smith",
    position: "Sale Director"
};
let globalAmount = Number(purchaseDetails.quantity) * Number(purchaseDetails.unitPrice);
let emailContent = `Dear ${contactDetails.position} ${contactDetails.contactPerson},\n\n| ${myDetai
return {
    myDetails,
    purchaseDetails,
    contactDetails,
    globalAmount,
    emailContent
};
```

FIG. 16

"emailContent": "Dear Sale Director Mr Smith,

I, Mr John, Procurement Officer of BuyCorp, would like to place an order for 10 Printers at the unit price of 50$. The global amount for this purchase order is 500$.

The delivery should be made by 15th of July 2023.

Attached to this email are the Purchase Agreement and Invoice, encrypted with the password 7dA5pRt#.

Should you have any queries, please feel free to contact me at johndoe@email.com or +1 {555} 123-4567.

Best regards,

Mr John"
}

FIG. 17

Payment Terms and Conditions
Amounts due to the contractor(s) shall be paid within an overall payment deadline of 10 days from the date of receipt of the payment requests.
In case of payment delay, the contractor is entitled to receive late payment interest as well as a fixed compensation for collection costs in the amount of €40. The late payment interest rate shall be equal to the interest rate applied by the European Central Bank to its most recent main refinancing operations in effect on the first day of the semester of the calendar year in which the late payment interest began to accrue, increased by eight percentage points.
Late Payment Penalties
When the contractual delivery deadline is exceeded due to the fault of the contractor, they shall incur penalties of 30/1000 of the value of the purchase order per day of delay, without prior notice.
The amount of the penalties shall be applied to the corresponding invoice amount.
By way of exception to Article 14.1.3 of the General Conditions of Contract for Supply and Services (GCC-FCS), the contractor shall not be exempt from penalties whose annual amount does not exceed €300 exclusive of tax for the entire annual framework agreement Given the above-mentioned late payment term and condition, is an invoice, of 200 euros, received on the 10/10/2022 is late on payment on the 01/01/2023? If it is the case, compute the due-penalties and generate a dunning letter?

Pseudo-anonymized prompt

Payment Terms and Conditions: Amounts due to the contractor{s} shall be paid within an overall payment deadline of ANO0001 days from the date of receipt of the payment requests. In case of payment delay, the contractor is entitled to receive late payment interest as well as a fixed compensation for collection costs in the amount of €ANO0002. The late payment interest rate shall be equal to the interest rate applied by the European Central Bank to its most recent main refinancing operations in effect on the first day of the semester of the calendar year in which the late payment interest began to accrue, increased by ANO0003 percentage points. Late Payment Penalties: When the contractual delivery deadline is exceeded due to the fault of the contractor, they shall incur penalties of ANO0004 ANO0005 of the value of the purchase order per day of delay, without prior notice. The amount of the penalties shall be applied to the corresponding invoice amount. By way of exception to Article 14.1.3 of the General Conditions of Contract for Supply and Services {GCC-FCS}, the contractor shall not be exempt from penalties whose annual amount does not exceed €ANO0006 exclusive of tax for the entire annual framework agreement. Given the above-mentioned late payment term and condition, is an invoice, of ANO0007 euros, received on the ANO0008 is late on payment on the ANO0009? If it is the case, compute the due-penalties and generate a dunning letter?

FIG. 19

Anonymized GenAI reply

```
var paymentDeadline = ANO0001;
var fixedCompensation = ANO0002;
var increasedInterestRate = ANO0003;
var penaltyRatio = ANO0004 / ANO0005;
var annualPenaltyLimit = ANO0006;
var invoiceAmount = ANO0007;
var invoiceReceivedDate = new Date(ANO0008);
var currentDate = new Date(ANO0009);

var latePayment = (currentDate – invoiceReceivedDate) / (1000 * 60 * 60 * 24) > paymentDeadline;
var latePaymentDays = Math.ceil((currentDate – invoiceReceivedDate) / (1000 * 60 * 60 * 24)) - payme
var penalty = latePaymentDays > 0 ? (invoiceAmount * penaltyRatio * latePaymentDays) : 0;
var totalPenalty = penalty > annualPenaltyLimit? annualPenaltyLimit : penalty;
var dunningLetter = latePayment ? 'Dear contractor,
We noticed that your payment is overdue for ${latePaymentDays} day(s).  According to the contract ter
Best regards,
The procurement team' : "";

return {
    "latePayment": latePayment,
    "penalty": totalPenalty,
    "dunningLetter": dunningLetter
};
```

FIG. 20

Pseudo-deanonymized GenAI reply

```
var paymentDeadline = 10;
var fixedCompensation = 40;
var increasedInterestRate = 8;
var penaltyRatio = 30 / 1000;
var annualPenaltyLimit = 300;
var invoiceAmount = 200;
var invoiceReceivedDate = new Date("10/10/2022");
var currentDate = new Date("01/01/2023");

var latePayment = (currentDate – invoiceReceivedDate) / (1000 * 60 * 60 * 24) > paymentDeadline;
var latePaymentDays = Math.ceil((currentDate – invoiceReceivedDate) / (1000 * 60 * 60 * 24)) - payme
var penalty = latePaymentDays > 0 ? (invoiceAmount * penaltyRatio * latePaymentDays) : 0;
var totalPenalty = penalty > annualPenaltyLimit ? annualPenaltyLimit : penalty;
var dunningLetter = latePayment ? 'Dear contractor, \n\nWe noticed that your payment is overdue for return {
    "latePayment": latePayment,
    "penalty": totalPenalty,
    "dunningLetter": dunningLetter
};
```

{
"latePayment": true,
"penalty": 300,
"dunningLetter": "Dear contractor,

We noticed that your payment is overdue for 74 day(s). According to the contract terms, a penalty of 300 has been applied to your invoice. We kindly request you to settle the invoice at your earliest convenience.

Best regards,
The procurement team"
}

FIG. 22

PRIVACY-PRESERVING PROMPT ENGINEERING FOR GENERATIVE ARTIFICIAL INTELLIGENCE

BACKGROUND

The meteoric rise of generative artificial intelligence (AI) in industry has revolutionized automation, creative content generation, and data analysis, significantly boosting productivity and innovation across various sectors. In contrast to discriminative AI models which aim to make decisions or predictions based on features of the input data, generative AI models focus on generating new data points. A large language model (LLM) is a type of generative AI that can understand and generate human-like text, while multi-model generative AI extends this capability to generate a variety of media types, including text, images, audio, video, etc., allowing for more diverse and versatile content creation. In generative AI, such as LLMs, a prompt serves as an input or instruction that informs the AI of the desired content, context, or task, allowing users to guide the AI's text generation to produce tailored responses, explanations, or creative content based on the provided prompt.

Despite their immense potential, usage of generative AI (e.g., LLMs) in an enterprise environment introduces significant data privacy and security risks. When formulating prompts, users may unknowingly reveal sensitive details, leading to inadvertent exposure of proprietary data, trade secrets, and/or personal information. The fallout of this can be unauthorized access to confidential data and/or intellectual property, breaches of privacy, and other security risks. The potential for prompting-induced data breaches is compounded by the risk of violating data privacy regulations like European Union's General Data Protection Regulation (GDPR) and California Consumer Privacy Act (CCPA). Thus, improving data security when integrating generative AI into an enterprise environment is desired.

BRIEF DESCRIPTION OF THE DRAWINGS

FIG. 6 depicts another use case which illustrates handling of sensitive numerical information contained in a prompt according to the privacy-preserving prompt engineering technique describe herein.

FIG. 8 depicts an example user-entered prompt which contains sensitive texture information.

FIG. 9 depicts an example anonymized prompt modified from the prompt of FIG. 8.

FIG. 10 depicts an example anonymized reply generated by an LLM in response to the anonymized prompt of FIG. 9.

FIG. 11 depicts an example deanonymized reply modified from the anonymized reply of FIG. 10.

FIG. 12 depicts an example reply presented to the user, the reply being generated based on evaluation of the deanonymized reply of FIG. 11.

FIG. 13 depicts another example user-entered prompt which requests computation on sensitive data.

FIG. 14 depicts an example anonymized prompt modified from the prompt of FIG. 13.

FIG. 16 depicts an example deanonymized reply modified from the anonymized reply of FIG. 15.

FIG. 17 depicts an example reply presented to the user, the reply being generated based on evaluation of the deanonymized reply of FIG. 16.

FIG. 18 depicts another example user-entered prompt which requests logical reasoning on sensitive data.

FIG. 19 depicts an example anonymized prompt modified from the prompt of FIG. 18.

FIG. 20 depicts an example anonymized reply generated by an LLM in response to the anonymized prompt of FIG. 19.

FIG. 21 depicts an example deanonymized reply modified from the anonymized reply of FIG. 20.

FIG. 22 depicts an example reply presented to the user, the reply being generated based on evaluation of the deanonymized reply of FIG. 21.

DETAILED DESCRIPTION

Figure 1:
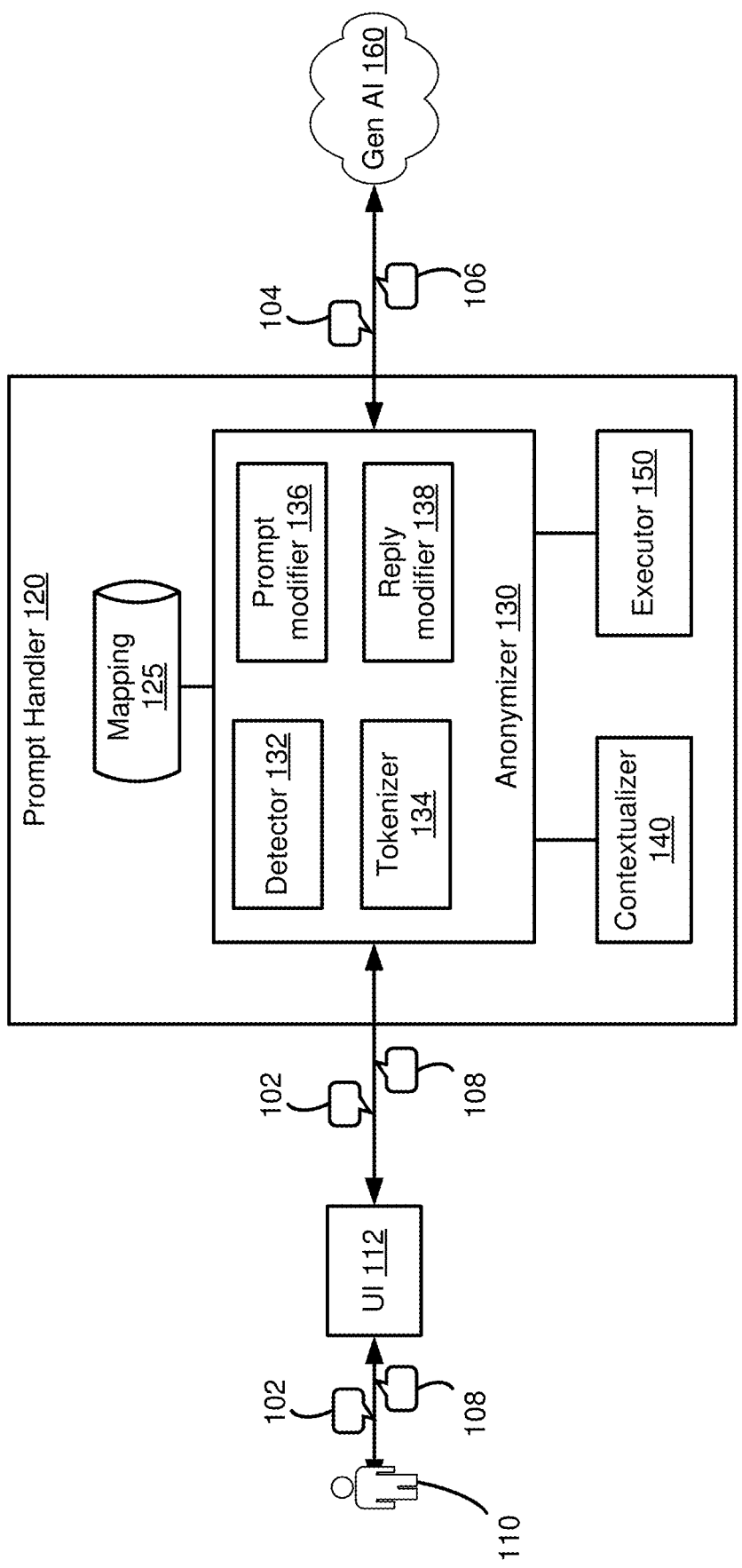
FIG. 1 is an overall block diagram of an example computing system providing improved data security when integrating generative AI into an enterprise environment.

Overview of Data Security in Generative AI

Generative AI is a type of AI that can create content, such as text, images, or even code, and it's used in enterprise environments for tasks like automated content generation, data analysis, and chatbot interactions to enhance productivity and efficiency. Generative AI chatbots have become increasingly popular and powerful, thanks to advances in LLMs, which are neural network architectures that can learn and generate natural language from massive amounts of text data. ChatGPT, Google Bard, and Bing Chat are some examples of chatbots that leverage LLMs to produce realistic and diverse responses to user inputs and queries. LLMs use deep learning algorithms to capture and reproduce linguistic patterns, allowing them to generate fluent and relevant textual outputs for various domains and genres.

However, generative AI (e.g., LLMs) also poses significant challenges for data privacy and security, especially in an enterprise setting. For instance, when interacting with a LLM, a user may unintentionally disclose personal or proprietary information in their prompts, such as names, addresses, phone numbers, email addresses, credit card numbers, passwords, etc. Such information can be extracted and stored by the LLM or its provider, leading to potential data breaches, unauthorized access to confidential data and/or intellectual property, privacy violations, identity theft, fraud, and other cyberattacks.

Importantly, interacting with generative AI may also infringe data privacy regulations that aim to protect the rights and interests of data subjects and data controllers. For example, the GDPR and CCPA require that data controllers and processors obtain consent from data subjects before collecting, processing, or sharing their personal data. They also grant data subjects the right to access, rectify, erase, restrict, or object to the use of their data. However, generative AI may not comply with these requirements, as they may collect and process personal data without explicit consent or notification and may not provide adequate mechanisms for data subjects to exercise their rights. This can result in legal liabilities and penalties for enterprise users who integrate the generative AI in their computing environments.

The technologies described herein overcome many of the technical challenges described above. Specifically, disclosed herein is a privacy-preserving prompt engineering technology which enables a user to interact with generative AI while shielding sensitive data contained in user's prompt from the generative AI. As a result, data security of integrating generative AI in enterprise environment can be improved.

Example Overview of LLMs and Prompts

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided to LLMs to generate responses. Prompts in LLMs can be initial input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Users can experiment with prompt variations to manipulate output, using techniques like prefixing, temperature control, top-K sampling, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Computing System with Improved Data Security in LLMs

FIG. 1 shows an overall block diagram of an example computing system 100 providing improved data security when integrating generative AI into an enterprise environment.

As shown in FIG. 1, a user 110 who intends to interact with a generative AI 160 can enter a prompt 102 (also referred to as a "prompt query") through a user interface (UI) 112. In some examples, the generative AI 160 can be an LLM configured to generate text content responsive to a received prompt. As described herein, the text content generated by the LLM can also be referred to as an answer or reply. In some examples, the generative AI 160, responsive to the received prompt, can be configured to generate images, audio, video, etc. In some examples, the generative AI 160, responsive to the received prompt, can be configured to generate multi-model content including text, images, audio, video, or any combination thereof. In the examples described below, an LLM is described as an example generative AI, although it should be understood that the privacy-preserving prompt engineering technology disclosed herein can also be applied to other types of generative AI.

As shown in FIG. 1, a prompt handler 120 interlinks between the user interface 112 and the generative AI 160. As described more fully below, the prompt handler 120 acts as a security layer between an enterprise environment and the external generative AI 160, ensuring users of the enterprise environment can communicate with the generative AI 160 without leaking sensitive information.

The original prompt 102 entered by the user 110 is first processed, and can be modified, by the prompt handler 120 before being communicated to the generative AI 160. Generally, the user 110 can interact with the generative AI 160 via a web browser or an application programming interface (API). In a web browser environment, the prompt handler 120 can be implemented as a browser extension. When leveraging an API for communication with the Generative AI, the prompt handler 120 can be implemented as a dedicated application residing on a system that is within user's trusted domain, often referred to as on-premise.

As shown in FIG. 1, the prompt handler 120 can include an anonymizer 130, a contextualizer 140, an executor 150, and a mapping storage 125. The anonymizer 130 can further include a detector 132, a tokenizer 134, a prompt modifier 136, and a reply modifier 138.

In the depicted example, the mapping storage 125, the contextualizer 140, and the executor 150 are outside the anonymizer 130. In other examples, any of the mapping storage 125, the contextualizer 140, and the executor 150 can be inside or part of the anonymizer 130. In any case, the mapping storage 125 is local to the prompt handler 120 and reside on the user's trusted domain.

After receiving the prompt 102 entered by the user 110 through the user interface 112, the detector 132 can be configured to scan or parse the prompt 102 to identify sensitive data contained in the prompt 102 that violates a security protocol. As described herein, a security protocol is a set of guidelines and procedures designed to protect sensitive data from unauthorized access, use, disclosure, modification, or destruction. The security protocol can outline rules for data protection and the responsibilities of those who handle the data. The content of the security protocol can vary or user-defined depending on the nature of the data and the organization's needs. For example, the security protocol can include definitions of sensitive data (e.g., personal information like names, social security numbers, birthdates, addresses, credit card information, phone numbers, email addresses; business-critical information like pricing data, cost data, sales data, invoice data, specific dates; trade secrets; etc.). In some examples, the security protocol can be updated on a regular basis (e.g., periodically) or as needed (e.g., ad hoc). Example techniques for detecting sensitive data are described more fully below.

The anonymizer 130 can be configured to anonymize the prompt 102 containing sensitive data. Specifically, the tokenizer 134 can be configured to generates unique, non-sensitive tokens to represent each piece of sensitive data identified by the detector 132. In some examples, the tokenizer 134 can be configured to hash the sensitive data using a cryptographic hash algorithm to convert one or more pieces of the sensitive data into one or more unique hash values represented by fixed-length strings of characters. The hash algorithm can be selected to minimize collisions so as to ensure the uniqueness of the generated hash values. For example, SHA-256 (part of the SHA-2 family) algorithm can be used to generates a 256-bit hash value for each piece of sensitive data, and due to its large output space, it is extremely unlikely for two different inputs to produce the same hash value. In addition to or in lieu of using cryptographic hashing, other tokenization techniques can be used to generate unique, non-sensitive tokens. For example, cryptographically secure random number generators can be used to generate random numbers with a high degree of entropy and use those random numbers as tokens. As another example, universally unique identifiers (UUID), which are 128-bit labels that can be generated using UUID generators (e.g., UUID-2, UUID-3, UUID-5, etc.), can be used as tokens representing pieces of the sensitive data. In yet a further example, the unique, non-sensitive tokens can be generated using a counter-based approach, where a counter is incremented for each token generation, and then the counter can be combined with other data (e.g., a predefined prefix to form unique tokens).

A mapping or lookup table can be created to link the unique, non-sensitive tokens generated by the tokenizer 134 to the corresponding pieces of sensitive data identified by the detector 132. This mapping or lookup table can be persisted in the mapping storage 125.

The prompt modifier 136 can be configured to modify the prompt 102 by replacing pieces of sensitive data contained in the prompt 102 with corresponding unique, non-sensitive tokens (e.g., the hash values) generated by the tokenizer 134.

The output of the prompt modifier 136 can be a modified prompt 104, which can be submitted to the generative AI 160. The modified prompt 104 comprises the anonymized prompt in which the sensitive data identified by the detector 132 is replaced with unique, non-sensitive tokens generated by the tokenizer 134, as described above.

In some examples, the prompt modifier 136 can further modify the prompt 102 by adding a context prompt (which can also be referred to as a "context query") provided by the contextualizer 140. For example, the anonymized prompt (in which the sensitive data is replaced with unique, non-sensitive tokens) can be combined with the context prompt to form the modified prompt 104, which can be submitted to the generative AI 160.

As described herein, the context prompt can be configured to provide relevant contextual information for the prompt 102. In some examples, the context prompt can be configured to instruct the generative AI 160 to generate a script or software code in its reply. An administrator of the prompt handler 120 can design and/or edit the context prompt generated by the contextualizer 140. More details of the context prompt are described further below.

In response to the received modified prompt 104, the generative AI 160 can generate a reply 106, which contains anonymized sensitive data (e.g., the unique, non-sensitive tokens that replace the sensitive data contained in the original prompt 102). When generating the reply 106, the generative AI 160 not only analyzes the content included in the original prompt 102 (minus the sensitive data), but also takes into account instructions provided in the context prompt. As a result, the reply 106 output by the generative AI 160 can be restricted in scope and tailored to have a desired format.

After receiving the reply 106, the anonymizer 130 can be configured to deanonymize the reply 106. Specifically, the reply modifier 138 can be configured to covert the anonymized sensitive data in the reply 106 back into the original sensitive data contained in the prompt 102 by retrieving the mapping or lookup table persisted in the mapping storage 125. For example, each unique, non-sensitive token contained in the reply 106 can be replaced with a corresponding piece of sensitive data by searching the lookup table stored in the mapping storage 125 (also referred to as "inverse mapping").

The output of the reply modifier 138 can be a modified reply 108, which can be presented to the user 110 through the user interface 112. The modified reply 108 deanonymizes the reply 106 by replacing unique, non-sensitive tokens contained in the original reply 106 with pieces of original sensitive data contained in the original prompt 102, as described above.

In some examples, when the reply 106 returned by the generative AI 160 includes a script, the reply modifier 138 can further modify the deanonymized reply by evaluating and/or executing the script, e.g., by the executor 150. The modified reply 108 presented on the user interface 112 can thus include the output of executing the script. Examples scripts in replies and execution of such scripts are described further below.

In practice, the systems shown herein, such as the computing system 100, can vary in complexity, with additional functionality, more complex components, and the like. For example, there can be additional functionality within the prompt handler 120. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, prompts, tokens, replies, scripts, and the like can be stored in one or more computer-readable storage media or computer-readable storage devices. The technologies described herein can be generic to the specifics of operating systems or hardware and can be applied in any variety of environments to take advantage of the described features.

Example Sensitive Data Detection Techniques

As described herein, various techniques can be used by the detector 132 to detect sensitive data contained in the prompt 102.

In some examples, natural language processing (NLP) techniques can be used for sensitive data detection. One example NLP technique is named entity recognition (NER), which can identify and classify named entities in text, which can include personal data (e.g., names, addresses, phone numbers, etc.) and business-critical data (e.g., financial figures, etc.). Another example NLP technique is part-of-speech (POS) tagging, which can identify words or phrases that may indicate sensitive information, such as nouns representing job titles, company names, financial terms, etc. Yet another NLP technique is dependency parsing, which can analyze the grammatical structure of sentences to detect relationships between words and infer potential sensitive data.

In some examples, machine learning (ML) approaches can be used for sensitive data detection. One example ML technique is supervised learning, wherein ML algorithms trained on annotated data can learn patterns and features to classify text snippets as personal data or business-critical information. Example ML algorithms such as support vector machines (SVM) or deep learning models like recurrent neural networks (RNN) and transformers can be applied. Another ML approach is transfer learning, wherein pre-trained LLMs like Bidirectional Encoder Representations from Transformers (BERT) or Generative Pre-trained Transformers (GPT) can be fine-tuned on specific sensitive data detection tasks, allowing for more accurate identification of personal data and business-critical information.

In some examples, rule-based systems can be used for sensitive data detection. For example, regular expressions can be used to define specific patterns which can help detect common formats of personal data like social security numbers, email addresses, credit card numbers, etc. As another example, domain-specific rules can be tailored to specific domains or industries, thereby enhancing the detection of business-critical information, such as trade secrets, product codes, or financial data unique to an organization.

In some examples, hybrid approaches can be deployed for sensitive data detection. One example hybrid approach is ensemble modeling, wherein multiple detection techniques, such as NLP, ML, and rule-based systems, can be combined into an ensemble model to leverage the strengths of each method and improve overall detection performance. Another example hybrid approach is active learning, wherein human feedback is incorporated into the detection process by iteratively selecting samples for annotation, thereby enhancing the accuracy of sensitive data detection models.

Example Architecture of LLM

Figure 2:
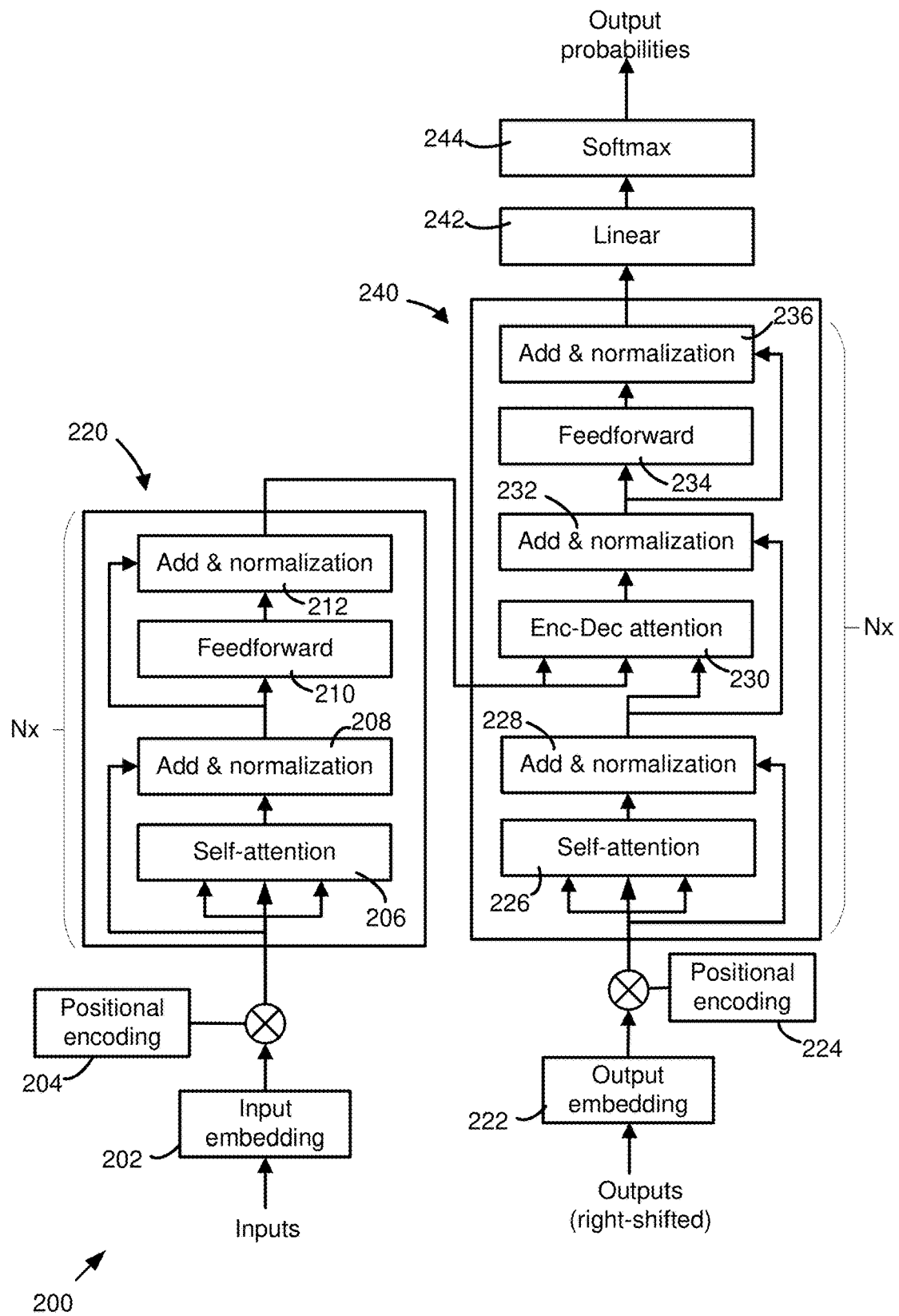
FIG. 2 is an architecture diagram of an example LLM.

FIG. 2 shows an example architecture of an LLM 200, which can be used as the generative AI 160 of FIG. 1.

In the depicted example, the LLM 200 uses an autoregressive model (as implemented in OpenAI's GPT) to generate text content by predicting the next word in a sequence given the previous words. The LLM 200 can be trained to maximize the likelihood of each word in the training dataset, given its context.

As shown in FIG. 2, the LLM 200 can have an encoder 220 and a decoder 240, the combination of which can be referred to as a "transformer." The encoder 220 processes input text, transforming it into a context-rich representation. The decoder 240 takes this representation and generates text output.

For autoregressive text generation, the LLM 200 generates text from left to right, and for each word it generates, it relies on the preceding words for context. During training, the target or output sequence, which the model is learning to generate, is presented to the decoder 240. However, the output is right shifted by one position compared to what the decoder 240 has generated so far. In other words, the model sees the context of the previous words and is tasked with predicting the next word. As a result, the LLM 200 can learn to generate text in a left-to-right manner, which is how language is typically constructed.

Text inputs to the encoder 220 can be preprocessed through an input embedding unit 202. Specifically, the input embedding unit 202 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 200, the targets or output sequences presented to the decoder 240 can be preprocessed through an output embedding unit 222. Like the input embedding unit 202, the output embedding unit 222 can provide a continuous representation, or output embedding, for each token in the output sequences.

Generally, the vocabulary in LLM 200 is fixed and is derived from the training data. The vocabulary in LLM 200 consists of tokens generated above during the training process. Words not in the vocabulary cannot be output. These tokens are strung together to form sentences in the text output.

In some examples, positional encodings (e.g., 204 and 224) can be performed to provide sequential order information of tokens generated by the input embedding unit 202 and output embedding unit 222, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 220 and decoder 240 can include multiple stacked or repeated layers (denoted by Nx in FIG. 2). The number of stacked layers in the encoder 220 and/or decoder 240 can vary depending on the specific LLM architecture. Generally, a higher "N" typically means a deeper model, which can capture more complex patterns and dependencies in the data but may require more computational resources for training and inference. In some examples, the number of stacked layers in the encoder 220 can be the same as the number of stacked layers in the decoder 240. In other examples, the LLM 200 can be configured so that the encoder 220 and decoder 240 can have different numbers of layers. For example, a deeper encoder (more layers) can be used to better capture the input text's complexities while a shallower decoder (fewer layers) can be used if the output generation task is less complex).

The encoder 220 and the decoder 240 are related through shared embeddings and attention mechanisms, which allow the decoder 240 to access the contextual information generated by the encoder 220, enabling the LLM 200 to generate coherent and contextually accurate responses. In other words, the output of the encoder 220 can serve as a foundation upon which the decoder network can build the generated text.

Both the encoder 220 and decoder 240 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 2, the encoder 220 includes an intra-attention or self-attention neural network 206 and a feedforward neural network 210, and the decoder 240 includes a self-attention neural network 226 and a feedforward neural network 234. The self-attention neural networks 206, 226 allow the LLM 200 to weigh the importance of different words or tokens within the same input sequence (self-attention in the encoder 220) and between the input and output sequences (self-attention in the decoder 240), respectively.

In addition, the decoder 240 also includes an inter-attention or encoder-decoder attention neural network 230, which receives input from the output of the encoder 220. The encoder-decoder attention neural network 230 allows the decoder 240 to focus on relevant parts of the input sequence (output of the encoder 220) while generating the output sequence. As described below, the output of the encoder 220 is a continuous representation or embedding of the input sequence. By feeding the output of the encoder 220 to the encoder-decoder attention neural network 230, the contextual information and relationships captured in the input sequence (by the encoder 220) can be carried to the decoder 240. Such connection enables the decoder 240 to access to the entire input sequence, rather than just the last hidden state. Because the decoder 240 can attend to all words in the input sequence, the input information can be aligned with the generation of output to improve contextual accuracy of the generated text output.

In some examples, one or more of the attention neural networks (e.g., 206, 226, 230) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 206, 226, 230) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 2, both the encoder 220 and the decoder 240 can include one or more addition and normalization layers (e.g., the layers 208 and 212 in the encoder 220, the layers 228, 232, and 236 in the decoder 240). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 242 at the output end of the decoder 240 can transform the output embeddings into the original input space. Specifically, the output embeddings produced by the decoder 240 are forwarded to the linear layer 242, which can transform the high-dimensional output embeddings into a space where each dimension corresponds to a word in the vocabulary of the LLM 200.

The output of the linear layer 242 can be fed to a softmax layer 244, which is configured to implement a softmax function, also known as softargmax or normalized exponential function, which is a generalization of the logistic function that compresses values into a given range. Specifically, the softmax layer 244 takes the output from the linear layer 242 (also known as logits) and transforms them into probabilities. These probabilities sum up to 1, and each probability corresponds to the likelihood of a particular word being the next word in the sequence. Typically, the word with the highest probability can be selected as the next word in the generated text output.

Still referring to FIG. 2, the general operation process for the LLM 200 to generate a reply or text output in response to a received prompt input is described below.

First, the input text is tokenized, e.g., by the input embedding unit 202, into a sequence of tokens, each representing a word or part of a word. Each token is then mapped to a fixed-length vector or input embedding. Then, positional encoding 204 is added to the input embeddings to retain information regarding the order of words in the input text.

Next, the input embeddings are processed by the self-attention neural network 206 of the encoder 220 to generate a set of hidden states. As described above, multi-head attention mechanism can be used to focus on different parts of the input sequence. The output from the self-attention neural network 206 is added to its input (residual connection) and then normalized at the addition and normalization layer 208.

Then, the feedforward neural network 210 is applied to each token independently. The feedforward neural network 210 includes fully connected layers with non-linear activation functions, allowing the model to capture complex interactions between tokens. The output from the feedforward neural network 210 is added its input (residual connection) and then normalized at the addition and normalization layer 212.

The decoder 240 uses the hidden states from the encoder 220 and its own previous output sequence to generate the next token in an autoregressive manner so that the sequential output is generated by attending to the previously generated tokens. Specifically, the output of the encoder 220 (input embeddings processed by the encoder 220) are fed to the encoder-decoder attention neural network 230 of the decoder 240, which allows the decoder 240 to attend to all words in the input sequence. As described above, the encoder-decoder attention neural network 230 can implement a multi-head attention mechanism, e.g., computing a weighted sum of all the encoded input vectors, with the most relevant vectors being attributed the highest weights.

The previous output sequence of the decoder 240 is first tokenized by the output embedding unit 222 to generate an output embedding for each token in the output sequence. Similarly, positional embedding 224 is added to the output embedding to retain information regarding the order of words in the output sequence.

The output embeddings are processed by the self-attention neural network 226 of the decoder 240 to generate a set of hidden states. The self-attention mechanism allows each token in the text output to attend to all tokens in the input sequence as well as all previous tokens in the output sequence. The output from the self-attention neural network 226 is added to its input (residual connection) and then normalized at the addition and normalization layer 228.

The encoder-decoder attention neural network 230 receives the output embeddings processed through the self-attention neural network 226 and the addition and normalization layer 228. Additionally, the encoder-decoder attention neural network 230 also receives the output from the addition and normalization layer 212 which represents input embeddings processed by the encoder 220. By considering both processed input embeddings and output embeddings, the output of the encoder-decoder attention neural network 230 represents an output embedding which takes into account both the input sequence and the previously generated outputs. As a result, the decoder 240 can generate the output sequence that is contextually aligned with the input sequence.

The output from the encoder-decoder attention neural network 230 is added to part of its input (residual connection), i.e., the output from the addition and normalization layer 228, and then normalized at the addition and normalization layer 232. The normalized output from the addition and normalization layer 232 is then passed through the feedforward neural network 234. The output of the feedforward neural network 234 is then added to its input (residual connection) and then normalized at the addition and normalization layer 236.

The processed output embeddings output by the decoder 240 are passed through the linear layer 242, which maps the high-dimensional output embeddings back to the size of the vocabulary, that is, it transforms the output embeddings into a space where each dimension corresponds to a word in the vocabulary. The softmax layer 244 then converts output of the linear layer 242 into probabilities, each of which corresponds to the likelihood of a particular word being the next word in the sequence. Finally, the LLM 200 samples an output token from the probability distribution generated by the softmax layer 244 (e.g., selecting the token with the highest probability), and this token is added to the sequence of generated tokens for the text output.

The steps described above are repeated for each new token until an end-of-sequence token is generated or a maximum length is reached. Additionally, if the encoder 220 and/or decoder 240 have multiple stacked layers, the steps performed by the encoder 220 and decoder 240 are repeated across each layer in the encoder 220 and the decoder 240 for generation of each new token.

Example Overview of Privacy-Preserving Prompt Engineering

Figure 3:
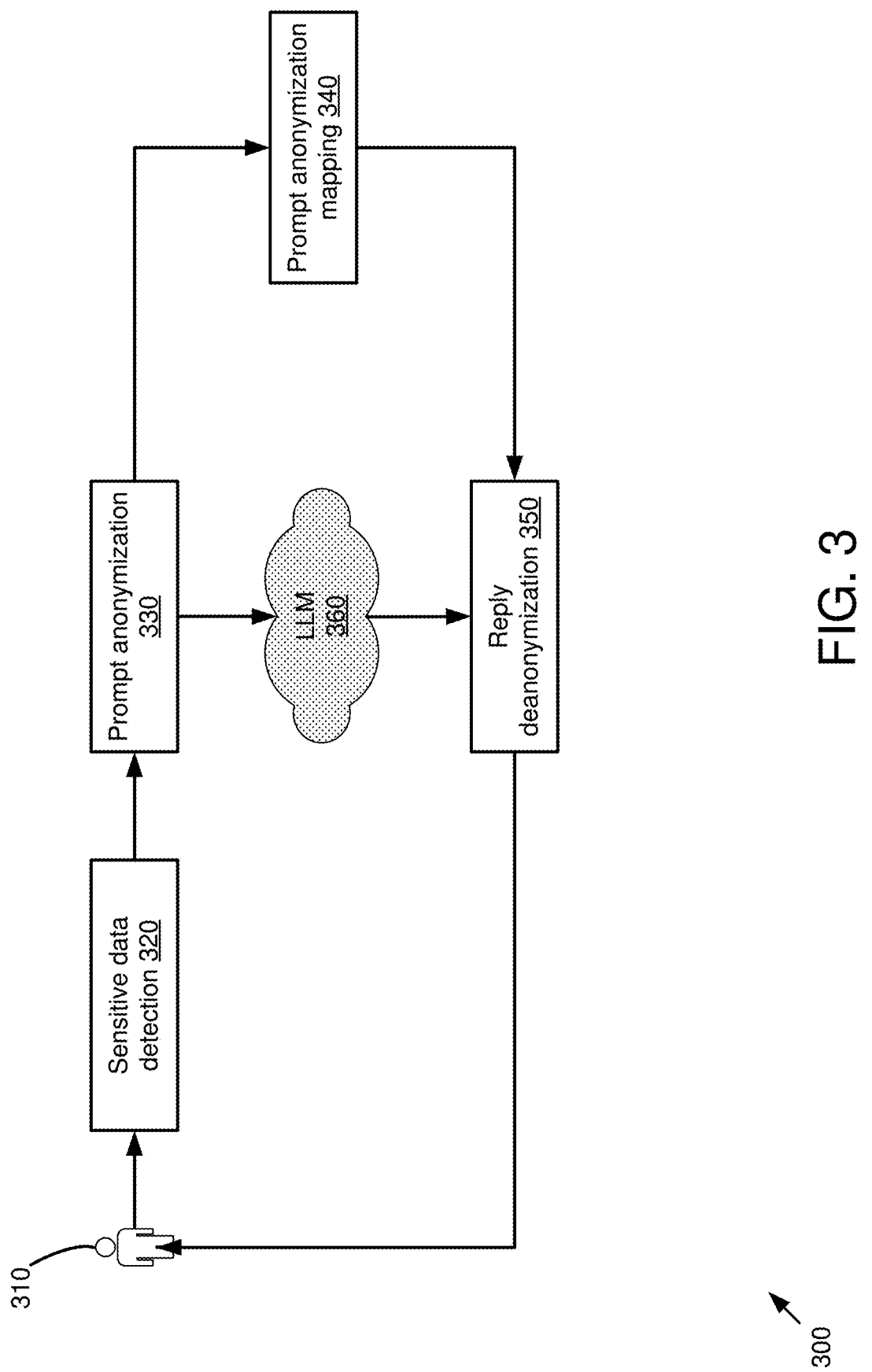
FIG. 3 is a high-level technical architecture diagram of the privacy-preserving prompt engineering technology disclosed herein.

FIG. 3 depicts a high-level technical architecture 300 depicting multiple stages of the privacy-preserving prompt engineering technology disclosed herein. The architecture 300 can be implemented in the computing system 100 of FIG. 1.

As shown in FIG. 3, a user 310 can enter a prompt intended to be submitted to an LLM 360, which can be an embodiment of the LLM 200. At a sensitive data detection stage 320, the user entered prompt is scanned (e.g., by the detector 132) to detect sensitive data that potentially violates a security protocol. Then, at a prompt anonymization stage 330, the user entered prompt is anonymized (e.g., by the anonymizer 130) so that the each piece of sensitive data in the prompt is replaced with a corresponding unique, non-sensitive token. In some examples, the anonymized prompt can also include a context prompt (e.g., provided by the contextualizer 140) configured to provide additional instructions to the LLM 360, e.g., to generate a script in the reply. The anonymized prompt is then submitted to the LLM 360. Meanwhile, at a prompt anonymization mapping stage 340, a mapping or lookup table which links the unique, non-sensitive tokens to the corresponding pieces of sensitive data can be persisted in a local storage (e.g., the mapping storage 125). After receiving the anonymized prompt, the LLM 360 can generate a reply which contains the unique, non-sensitive tokens. At a reply deanonymization stage 350, the original reply generated by the LLM 360 is deanonymized by replacing each unique, non-sensitive token contained in the reply with a corresponding piece of sensitive data based on the mapping or lookup table persisted in the local storage. When the reply includes a script, such script can be executed after deanonymizing the reply. The deanonymized reply can then be returned to the user 310.

Note that in FIG. 3, except for the LLM 360 which may reside in a user-untrusted domain (e.g., provided by a third party), all other stages (e.g., the sensitive data detection stage 320, the prompt anonymization stage 330, the prompt anonymization mapping stage 340, and the reply deanonymization stage 350) reside in a trusted domain of the user 310. Thus, all sensitive data included in the user's prompt is exclusively retained in the user trusted domain, and none of the sensitive data is leaked to the user-untrusted domain.

Example Overall Method for Improving Data Security in LLMs

Figure 4:
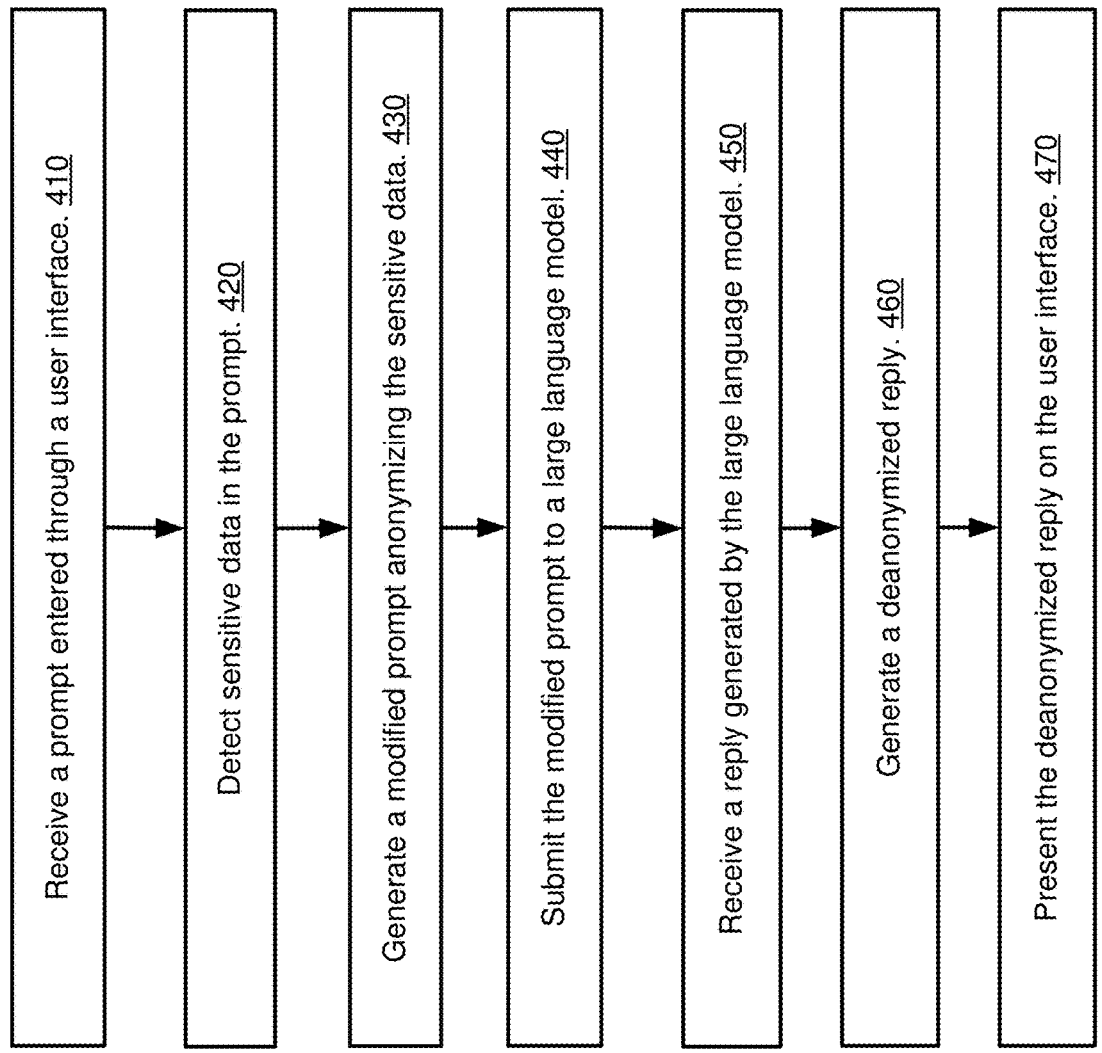
FIG. 4 is a flowchart illustrating an example method for implementing privacy-preserving prompt engineering for LLMs.

FIG. 4 is a flowchart illustrating an example overall method 400 for improving data security when integrating LLMs into an enterprise environment. The method 400 can be performed, e.g., by the computing system 100 of FIG. 1.

At step 410, an original prompt intended to be sent to an LLM is entered through a user interface (e.g., the user interface 112). The received prompt can be displayed on the user interface.

At step 420, sensitive data in the original prompt that violates a security protocol can be detected (e.g., by the detector 132).

At step 430, a modified prompt which anonymizes the sensitive data detected in the original prompt can be generated (e.g., by the prompt modifier 136). As described above, the prompt anonymization can be implemented by replacing pieces of sensitive data contained in the original prompt with corresponding unique, non-sensitive tokens generated by a tokenizer (e.g., the tokenizer 134). In some examples, the modified prompt can also include a context prompt (e.g., provided by the contextualizer 140) configured to provide relevant contextual information for the original prompt.

At 440, the modified prompt can be submitted to a large language model (e.g., the LLM 200 or 360).

At 450, a reply generated by the LLM is received (e.g., by the anonymizer 130). The reply generated by the LLM may contain anonymized sensitive data (e.g., the unique, non-sensitive tokens generated by a tokenizer). In some examples, the reply can include a script according to instructions provided in the context prompt.

At 460, a modified reply which deanonymizes the anonymized sensitive data can be generated (e.g., by the reply modifier 138). The reply deanonymization can be performed, e.g., by replacing each unique, non-sensitive token contained in the original reply with a corresponding piece of sensitive data contained in the original prompt. When the reply includes a script, the script can be evaluated (e.g., by the executor 150).

Then at 470, the modified reply can be presented on the user interface.

The method 400 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example Prompts and Replies

Figure 5:
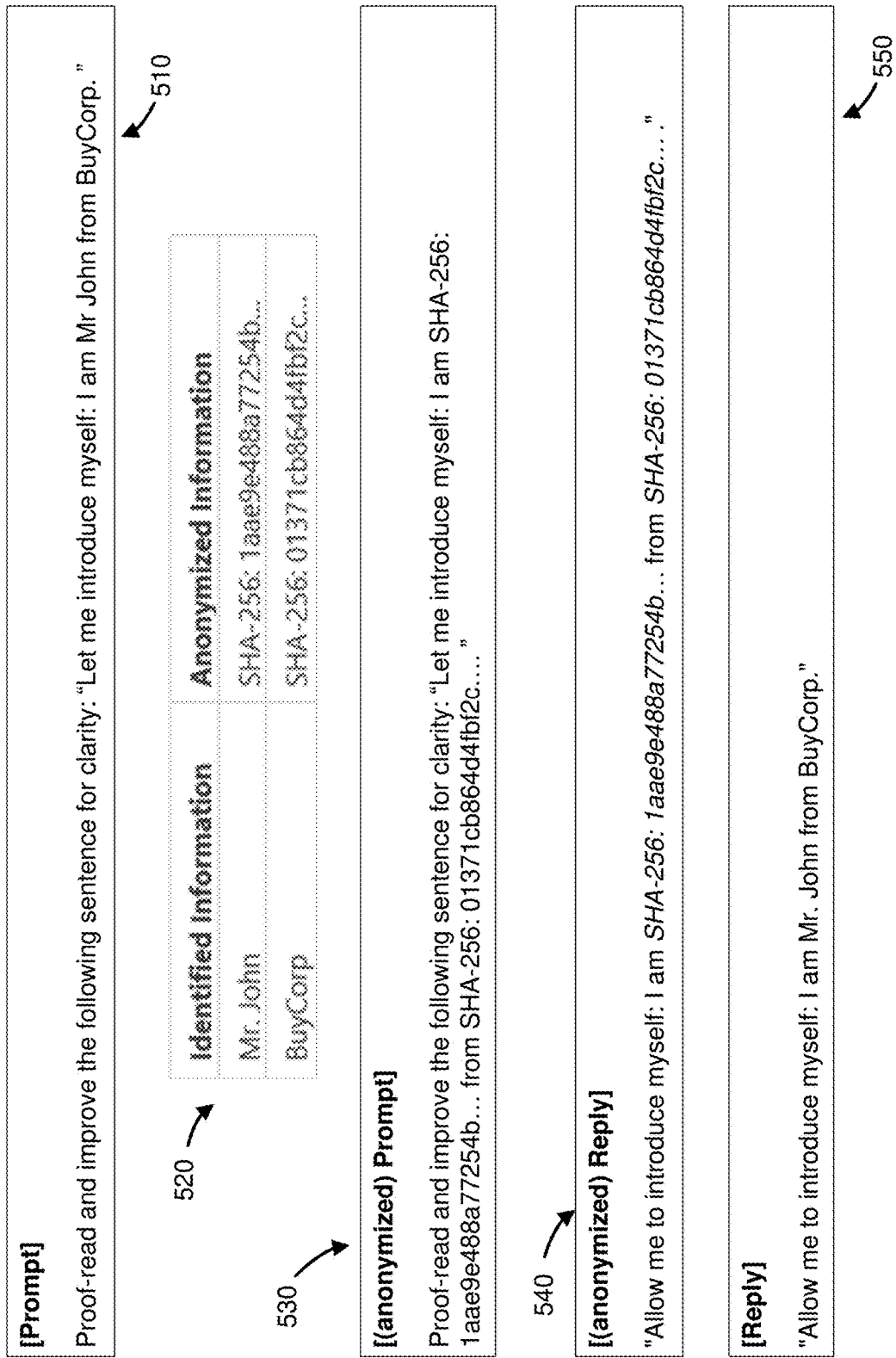
FIG. 5 depicts a use case which illustrates handling of sensitive textual information contained in a prompt according to the privacy-preserving prompt engineering technique describe herein.

FIG. 5 depicts a use case which illustrates handling of sensitive textual information contained in a prompt according to the privacy-preserving prompt engineering technique describe herein.

In this example, a user enters an original prompt 510 which requests an LLM to proofread and improve a sentence. The original prompt 510, however, contains sensitive data that violates a security protocol. Specifically, the sensitive data detected in the original prompt 510 includes personal information (e.g., a person's name "Mr. John") business-critical information (e.g., a company name "Buy-Corp").

The detected sensitive data is deanonymized as shown in a table 520. Specifically, each piece of sensitive data is hashed by applying a SHA-256 algorithm to generate a corresponding hash value (i.e., anonymized information) in this example. Other hashing algorithms, or more generally, tokenization algorithms, can be applied to convert each piece of the sensitive data to a corresponding unique, non-sensitive token.

An anonymous prompt 530 is modified from the original prompt 510 by replacing sensitive data with corresponding anonymized information (e.g., hash values). The anonymous prompt 530 can then be submitted to the LLM.

Responsive to the received anonymous prompt 530, the LLM can generate an original reply 540 which represents a result of proofreading and improvement of the anonymous prompt 530. Since the sensitive data is not leaked to the LLM, the reply 540 is anonymized because it includes the anonymized information (e.g., hash values) that is provided to the LLM.

Finally, a modified reply 550 can be presented to the user in response to the original prompt 510. The modified reply 550 is modified from the original reply 540 by replacing the anonymized information (e.g., hash values) with corresponding sensitive data contained in the original prompt 510.

FIG. 6 depicts another use case which illustrates handling of sensitive numerical information contained in a prompt according to the privacy-preserving prompt engineering technique describe herein.

In this example, a user enters an original prompt 610 which also requests an LLM to proofread and improve a sentence. Different from the example shown in FIG. 6 which contains plain text, the original prompt 610 includes calculation of some numerical values. In this example, the original prompt 610 contains sensitive data including the following business-critical information: units of product (10), unit price ($50), and total price ($600). Note that the calculation in the original prompt has an error: the total price should be $500 (10×$50) instead of $600.

The detected sensitive data is deanonymized as shown in a table 620. Specifically, each piece of sensitive data is hashed by applying a SHA-256 algorithm to generate a corresponding hash value (i.e., anonymized information) in this example. Other hashing algorithms, or more generally, tokenization algorithms, can be applied to convert each piece of the sensitive data to a corresponding unique, non-sensitive token.

An anonymous prompt 630 is modified from the original prompt 610 by replacing sensitive data with corresponding anonymized information (e.g., hash values). The anonymous prompt 630 can then be submitted to the LLM.

Responsive to the received anonymous prompt 630, the LLM can generate an anonymized reply 640 which includes the anonymized information (e.g., hash values) instead of the sensitive data. Note that the total price in the anonymized reply is a denoted by an evaluation of a mathematical expression containing anonymized values (e.g., "$'eval (SHA-256: bfbla9d0c64 . . . *SHA-256: 0908406f051 . . . )'$"). The mathematical expression can be part of a script generated by the LLM, as described further below.

Finally, a modified reply 650 can be presented to the user in response to the user's original prompt 610. The modified reply 650 is modified from the anonymized reply 640 by replacing the anonymized information (e.g., hash values) with corresponding sensitive data contained in the original prompt 610. Note that the calculation error in the original prompt 610 is corrected in the modified reply 650, which shows the correct total price $500.

Example Software Operation Sequence

Figure 7:
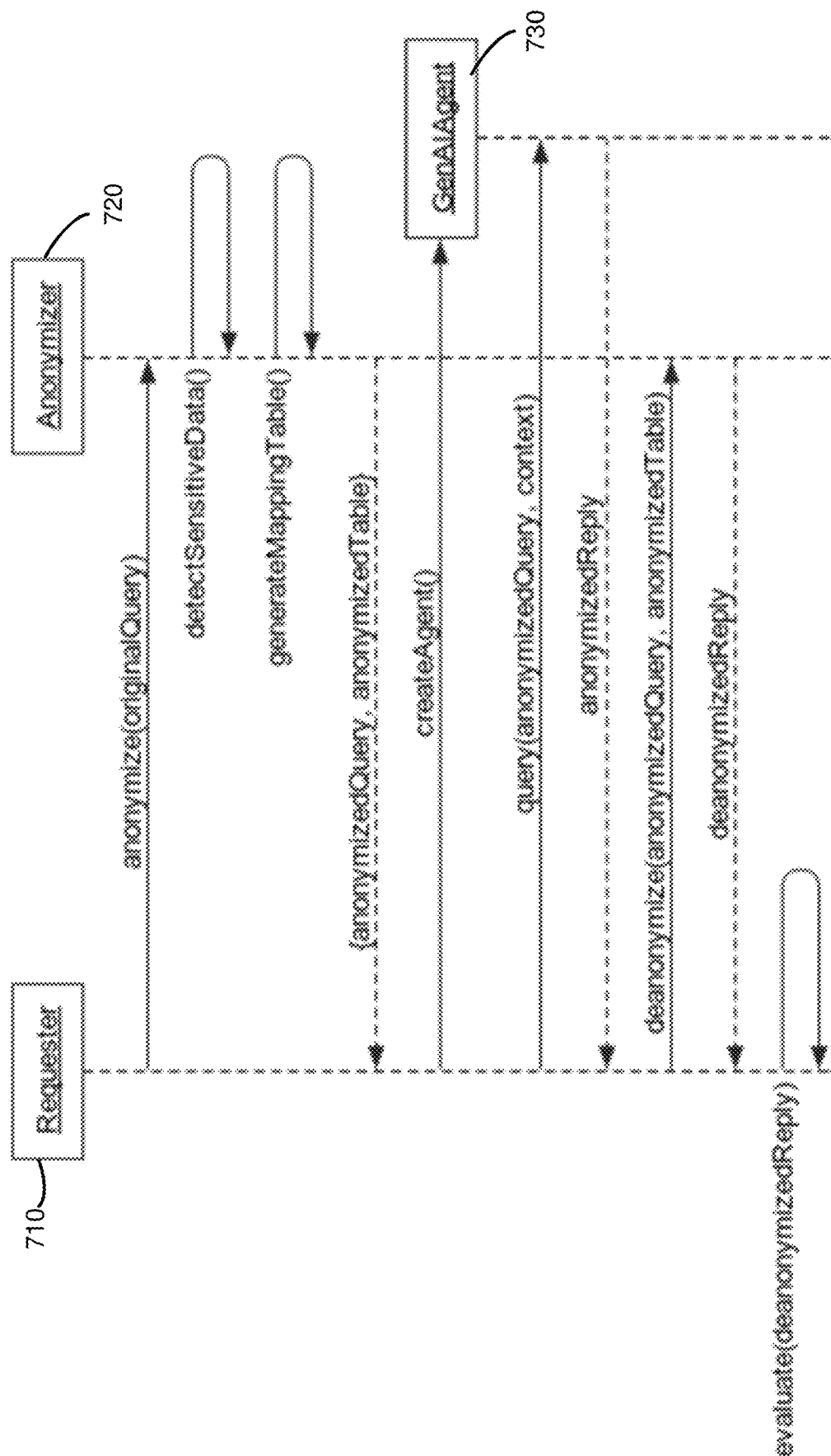
FIG. 7 is a sequence diagram illustrating an example software operation sequence for implementing privacy-preserving prompt engineering for LLMs.

FIG. 7 is a sequence diagram illustrating an example software operation sequence 700 for implementing privacy-preserving prompt engineering for LLMs. The software operation sequence 700 can be implemented by the computing system 100 of FIG. 1.

The software operation sequence 700 involves interplay between a requester 710, an anonymizer 720, and a generative AI agent (GenAIAgent) 730. The generative AI agent 730 represents an instance of an LLM (e.g., the LLM 200 or 360) which is evoked after calling an API of the LLM or through a browser extension. The requester 710 represents a software artifact configured to receive a user's original prompt (intended to be submitted to the LLM) and present a final reply (modified from an original reply generated by the LLM) to the user. In some examples, the requester 710 can be implemented as a part of the user interface 112 of FIG. 1. The anonymizer 720 represents a software module configured to anonymize user's original prompt and deanonymize the original reply generated by the LLM. For example, the anonymizer 720 can be a software implementation of the anonymizer 130 of FIG. 1.

The interactions between the requester 710, the anonymizer 720, and the generative AI agent 730 can be implemented by a series of function or method calls. For example, as shown in FIG. 7, after receiving an original prompt (denoted as "originalQuery"), the requester 710 can send an anonymization request (e.g., via a function call "anonymize") to the anonymizer 720.

After receiving the request, the anonymizer 720 can first detect sensitive data contained in the original prompt (e.g., via a function call "detectSensitiveData"), and then generate a mapping or lookup table (e.g., via a function call "generateMappingTable") which links detected sensitive data to corresponding anonymized information (e.g., hash values). Then, the anonymizer 720 can return an anonymized prompt (denoted as "anonymizedQuery") to the requester 710. As described above, the anonymized prompt replaces the sensitive data in the original prompt with anonymized information. The lookup table (denoted as "anonymizedTable") can be persisted in a local data storage. In some examples, the anonymizer 720 can also return the lookup table or a reference (e.g., a pointer) of the lookup table to the requester

710. In some examples, the anonymizer 720 can keep a copy of the lookup table or the reference of the lookup table.

The requester 710 can instantiate a generative AI agent 730 (e.g., via a function call "createAgent"). Then, the requester 710 can send a query to the generative AI agent 730 (e.g., via a function call "query") along with a modified prompt including the anonymized prompt and a context prompt (denoted as "context"). The context prompt can provide additional instructions to the generative AI agent 730.

The generative AI agent 730 can return to the requester 710 an anonymized reply (denoted as "anonymizedReply") that is responsive to the modified prompt. The anonymized reply includes anonymized information instead of the sensitive data. The anonymized reply can also include a script generated by the generative AI agent 730 according to the instructions provided by the context prompt.

After receiving the anonymized reply, the requester 710 can send a request (e.g., via a function call "deanonymize") to the anonymizer 720, along with the anonymized reply. In some examples, the requester 710 can also send to the anonymizer 720 the lookup table or the reference of the lookup table if the anonymizer 720 does not keep a copy of the lookup table or the reference of the lookup table.

Then, the anonymizer 720 can return to the requester 710 a deanonymized reply (denoted as "deanonymizedReply"), in which the anonymized information is replaced with corresponding sensitive data based on inverse mapping of the lookup table.

Finally, the requester 710 can evaluate the deanonymized reply. Such evaluation can include executing the script included in the deanonymized reply.

Example Context Prompt

In various examples described herein, a context prompt or context query can be used in conjunction with, and to provide relevant contextual information for, the user-entered prompt (later anonymized). Such contextual information can be used to clarify the user's intent and guide the LLM's response, thereby tailoring the LLM's reply to the user's specific needs, ultimately enhancing the quality and relevance of the content generated by the LLM.

For example, the context prompt can be used to define or narrow the scope of the reply by specifying what should be included or excluded in the reply, and/or influence the format of the reply. As another example, the context prompt can be used to enhance response relevance, ensuring that the generated reply is more accurate and contextually appropriate. In some examples, the context prompt can be used reduce ambiguity and prevent the LLM from producing irrelevant or unintended information. In some examples, the context prompt can be used to enable personalization, allowing the LLM to tailor its responses to the user's specific preferences or requirements. In some examples, the context prompt can also be used to mitigate bias by setting appropriate boundaries and expectations, thus guiding the LLM away from generating potentially biased or inappropriate reply.

Specifically, the context prompt can be configured to instruct the LLM to generate a script in the reply which can be directly evaluated or executed. As an example, the following context prompt includes eight lines of instructions:

"1. If you are not processing anonymized data, answer the questions directly.

2. If you are processing anonymized data, generate JavaScript code to handle the upcoming questions.

3. Ensure the JavaScript code is not wrapped within a dedicated function.

4. The JavaScript code should not include any sensitive characters or information.

5. The last instruction in the generated JavaScript code should return a JSON structure containing computed information.

6. Utilize ONLY the provided anonymized data without numerical values or replacements.

7. The JavaScript code should use the provided anonymized data."

The above example context prompt can be inserted above the user-provided prompt (later anonymized). In this specific example, the context prompt instructs the LLM to generate a script written in JavaScript in the reply. The context prompt also instructs the LLM to conclude the JavaScript with a return statement which returns a JSON structure containing computed information (based on content of the user-provided prompt).

To further improve data security, the above context prompt instructs the LLM to use the "provided anonymized data" in the JavaScript and "should not include any sensitive characters or information." Such instruction can prevent the LLM from actively searching other sources (e.g., if the use-provided prompt refers to another data source or have an attachment) that may contain sensitive data.

Further, the above context prompt explicitly instructs the LLM to "utilize ONLY the provided anonymized data without numerical values or replacements." Such explicit instruction can reduce the risk of hallucination, which may occur if the content of the reply is not based on factual data but rather stems for the LLM's creative or speculative output (e.g., the LLM may substitute the anonymous information with artificial data in the absence of such explicit instruction).

Additionally, the above context prompt instructs the LLM that the generated JavaScript is not enclosed within a named or dedicated function. As a result, the JavaScript can be directly executable in a global scope (i.e., the JavaScript is written as standalone code, directly executable within the context where it is intended to run). This contrasts with a JavaScript wrapped within a dedicated function, in which variables and code defined within the function are not accessible outside of it (i.e., an error can be thrown if trying to access a variable or code within the function from outside of it).

Note that the above context prompt is merely exemplary and exact wording of the context prompt can vary. In other examples, the context prompt can be configured to instruct the LLM to generate software code written in a different programming language (e.g., Python, C++, etc.), either scripted or compiled. The return statement may also contain a data structure organized in different formats (e.g., XML, YAML, etc.). In some examples, the context prompt can include other instructions for the LLM, e.g., "consider proper units and metric conversion for comparing and/or calculating anonymized data."

Instructing the LLM to generate a script in the reply can be particularly helpful when the user-provided prompt requests the LLM to perform some arithmetic and/or logistic tasks. For example, the LLM can embed mathematical calculations and/or logistic operations within the JavaScript, which can be evaluated and executed (e.g., by the executor 150) to obtain specific answers before presenting the reply to the requesting user.

Example Use Cases

Three additional use cases are shown in FIGS. 8-22 to further illustrate the disclosed privacy-preserving prompt engineering technology for LLMs. In these examples, the example context prompt described above is used in conjunction with the user-provided prompts (later anonymized) to solicit replies from an LLM.

For the first use case, FIG. 8 shows an original prompt 800 entered by a user, which requests an LLM to generate an email based on content of the prompt 800. The original prompt 800 includes the following sensitive data which can be detected (e.g., by the detector 132): company name ("BuyCorp"), person's name ("Mr John"), phone number ("+1 (555) 123-4567"), email address (johndoe@email.com), product name ("PrintBrand"), unit quantity (10), unit price (50$), delivery date ("15th of July 2023"), password ("7dA5pRt #"), and contact person ("Mr Smith").

FIG. 9 shows an anonymized prompt 900 modified from the original prompt 800. In the anonymized prompt 900, each piece of sensitive data detected in the original prompt 800 is replaced with a corresponding unique, non-sensitive token. In this example (and the following examples), the tokens replacing the sensitive data are expressed in strings starting with a prefix "ANO" followed by a counter. As described above, the tokens can also be expressed in hash values.

A modified prompt can be generated by combing the anonymized prompt 900 with the example context prompt described above, and then submitted to the LLM. FIG. 10 shows an example reply 1000 originally generated by the LLM. As shown, the reply 1000 is written in JavaScript, according to the instructions of the context prompt. The JavaScript is concluded with a return statement which returns an "email" structure (organized internally in JSON format). Fields within the "email" structure includes headings (e.g., "emailTo," "emailFrom," "subject") and "body" of the email generated by the LLM. Note that the reply 1000 is anonymous because it includes anonymized information (i.e., tokens) and does not contain any of the detected sensitive data.

FIG. 11 shows a deanonymized reply 1100 generated based on the original reply 1000. The deanonymized reply 1100 (still in JavaScript) is the same as the original reply 1000 except that the anonymous information (e.g., tokens) is substituted with corresponding sensitive data contained in the original prompt 800.

FIG. 12 shows a final reply 1200 presented to the user. The final reply 1200 can be generated by evaluating or executing (e.g., via the executor 150) the JavaScript included in the deanonymized reply 1100. Thus, from the user's perspective, the final reply 1200 is produced as if in direct response to the user provided prompt 800. All intermediate steps (e.g., sensitive data detection, prompt anonymization, anonymization mapping, addition of context prompt, reply deanonymization, script evaluation, etc.) are hidden from the user.

For the second use case, FIG. 13 shows an original prompt 1300 entered by a user, which requests an LLM to generate an email based on content of the prompt 1300. Similar to the example of FIG. 8, the original prompt 1300 includes sensitive data. Additionally, the prompt 1300 requests the LLM to calculate the "global amount" for a purchase order based on the provided content.

FIG. 14 shows an anonymized prompt 1400 modified from the original prompt 1300. Similarly, in the anonymized prompt 1400, the sensitive data detected in the original prompt 1300 is substituted with anonymized information (e.g., tokens).

Figure 15:
FIG. 15 depicts an example anonymized reply generated by an LLM in response to the anonymized prompt of FIG. 14.

The anonymized prompt 1400 can be combined with the example context prompt described above and then submitted to the LLM. In response, FIG. 15 shows an example reply 1500 originally generated by the LLM. Similarly, the reply 1500 is written in JavaScript which is concluded with a return statement which returns a data structure (organized internally in JSON format) containing various fields (e.g., "myDetails," "purchaseDetails," "contactDetails," "globalAmount," and "emailContent"). Likewise, the reply 1500 includes anonymized information (i.e., tokens) and does not contain any of the sensitive data appeared in the original prompt 1300. Note that the JavaScript in the reply 1500 includes a line of code configured to calculate the "globalAmount" as the product of unit quantity ("quantity") and unit price ("unitPrice") that are specified in "purchaseDetails."

FIG. 16 shows a deanonymized reply 1600 modified from the original reply 1500 by replacing the anonymous information (e.g., tokens) with corresponding sensitive data contained in the original prompt 1300.

FIG. 17 shows a final reply 1700 presented to the user. Only the "emailContent" in the returned data structure is shown in FIG. 17 for simplicity. Likewise, the final reply 1700 can be generated by evaluating the JavaScript included in the deanonymized reply 1600. Such evaluation results in a calculated "globalAmount" (500$) in the reply 1700.

For the third use case, FIG. 18 shows an original prompt 1800 entered by a user. Similarly, the original prompt 1800 includes sensitive data. In this example, the prompt 1800 requests the LLM to perform some logical reasoning tasks (e.g., to determine if an invoice received on Oct. 10, 2022 is late on payment on Jan. 1, 2023), and based on the results of such reasoning, perform a calculation (e.g., "due-penalties") and draft a dunning letter.

FIG. 19 shows an anonymized prompt 1900 modified from the original prompt 1800, in which the sensitive data is substituted with anonymized information (e.g., tokens).

The anonymized prompt 1900 can be combined with the example context prompt described above and then submitted to the LLM. In response, FIG. 20 shows an example reply 2000 originally generated by the LLM. Similarly, the reply 2000 is written in JavaScript which is concluded with a return statement which returns a data structure (organized internally in JSON format) containing various fields (e.g., "latePayment," "penalty," and "dunningLetter"). Likewise, the reply 2000 includes anonymized information (i.e., tokens) and does not contain any of the sensitive data appeared in the original prompt 1800. Note that the JavaScript in the reply 2000 includes a line of code configured to determine if there is a late payment (e.g., comparing the difference between "currentDate" and "invoiceReceivedData" with the "paymentDeadline"). Additionally, the JavaScript in the reply 2000 also includes lines of code to calculate "latePaymentDays," "penalty," and "totalPenalty."

FIG. 21 shows a deanonymized reply 2100 modified from the original reply 2000 by replacing the anonymous information (e.g., tokens) with corresponding sensitive data contained in the original prompt 1800.

FIG. 22 shows a final reply 2200 presented to the user in the form of a dunning letter. Likewise, the final reply 2200 can be generated by evaluating the JavaScript included in the deanonymized reply 2100. Such evaluation results in a determination that there is a late payment (e.g., "latePayment" is true), and the calculated results for the "latePaymentDays" (e.g., overdue for 74 days) and the amount of "penalty" (300) in the final reply 2200.

Example Advantages

A number of advantages can be achieved via the technologies described herein.

Specifically, the technologies described herein provides an unobtrusive security layer between an enterprise environment and external LLMs (or generally, generative AI computing systems). In the enterprise environment, user prompts are anonymized to prevent any leakage of sensitive data to external LLMs. The responses from the LLMs are then deanonymized, ensuring users receive the desired answers without being aware of the security layer's presence. Thus, users can freely communicate with LLMs while sensitive data in users' prompts is shielded from the LLMs. As a result, users of the enterprise environment can leverage the power of LLMs without compromising data security.

Further, the technologies described herein can enrich the user prompts by supplying additional contextual information through context prompts. These context prompts not only can customize the LLM's response to meet the user's specific needs, but also can guide the LLM to include a script in its response. This feature is particularly beneficial when the user's prompt necessitates the performance of arithmetic or logistic tasks. The LLM is capable of incorporating mathematical calculations and logistic operations within the generated script. This script, once embedded, can be evaluated and executed, leading to the production of accurate answers that are subsequently delivered to the user. This smooth integration not only can improve the precision of responses but also can elevate the user experience by offering bespoke solutions promptly and seamlessly.

Example Computing Systems

Figure 23:
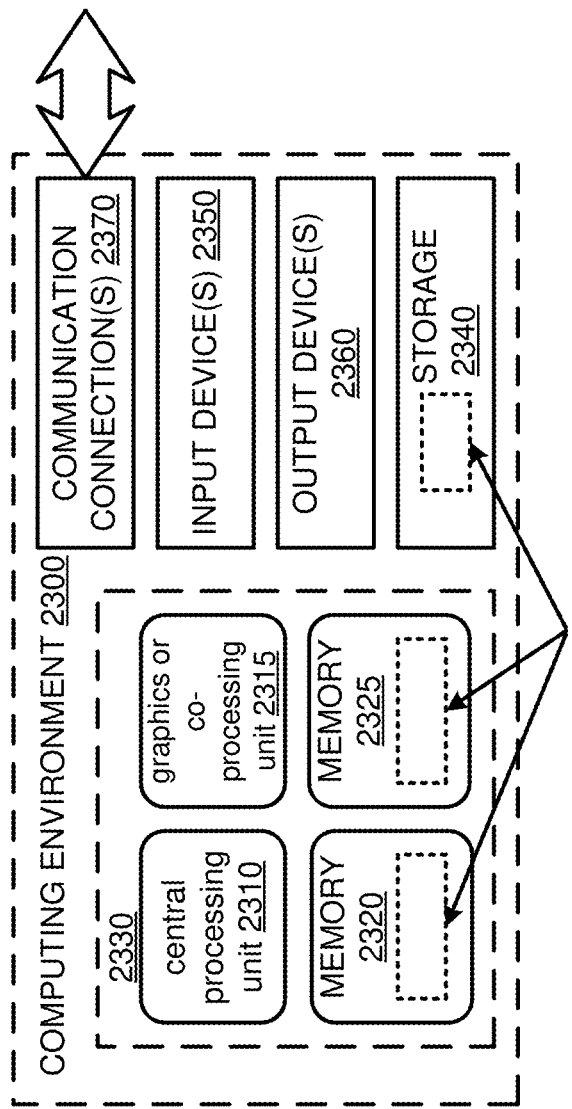
FIG. 23 is a block diagram of an example computing system in which described embodiments can be implemented.

FIG. 23 depicts an example of a suitable computing system 2300 in which the described innovations can be implemented. The computing system 2300 is not intended to suggest any limitation as to scope of use or functionality of the present disclosure, as the innovations can be implemented in diverse computing systems.

With reference to FIG. 23, the computing system 2300 includes one or more processing units 2310, 2315 and memory 2320, 2325. In FIG. 23, this basic configuration 2330 is included within a dashed line. The processing units 2310, 2315 can execute computer-executable instructions, such as for implementing the features described in the examples herein (e.g., the method 400). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 23 shows a central processing unit 2310 as well as a graphics processing unit or co-processing unit 2315. The tangible memory 2320, 2325 can be volatile memory (e.g., registers, cache, RAM), non-volatile memory (e.g., ROM, EEPROM, flash memory, etc.), or some combination of the two, accessible by the processing unit(s) 2310, 2315. The memory 2320, 2325 can store software 2380 implementing one or more innovations described herein, in the form of computer-executable instructions suitable for execution by the processing unit(s) 2310, 2315.

A computing system 2300 can have additional features. For example, the computing system 2300 can include storage 2340, one or more input devices 2350, one or more output devices 2360, and one or more communication connections 2370, including input devices, output devices, and communication connections for interacting with a user. An interconnection mechanism (not shown) such as a bus, controller, or network can interconnect the components of the computing system 2300. Typically, operating system software (not shown) can provide an operating environment for other software executing in the computing system 2300, and coordinate activities of the components of the computing system 2300.

The tangible storage 2340 can be removable or non-removable, and includes magnetic disks, magnetic tapes or cassettes, CD-ROMs, DVDs, or any other medium which can be used to store information in a non-transitory way and which can be accessed within the computing system 2300. The storage 2340 can store instructions for the software implementing one or more innovations described herein.

The input device(s) 2350 can be an input device such as a keyboard, mouse, pen, or trackball, a voice input device, a scanning device, touch device (e.g., touchpad, display, or the like) or another device that provides input to the computing system 2300. The output device(s) 2360 can be a display, printer, speaker, CD-writer, or another device that provides output from the computing system 2300.

The communication connection(s) 2370 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 24:
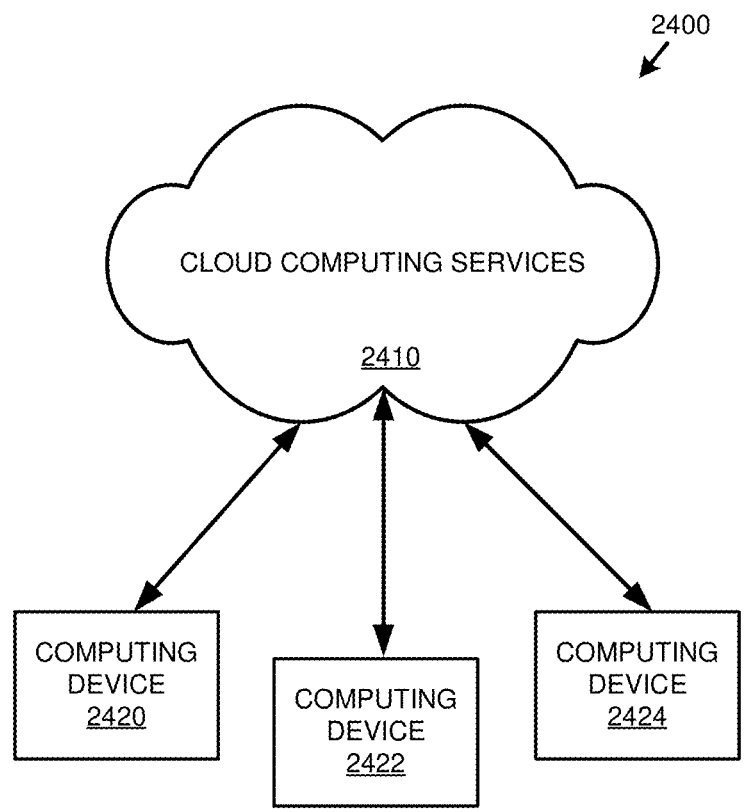
FIG. 24 is a block diagram of an example cloud computing environment that can be used in conjunction with the technologies described herein.

FIG. 24 depicts an example cloud computing environment 2400 in which the described technologies can be implemented, including, e.g., the system 100 and other systems herein. The cloud computing environment 2400 can include cloud computing services 2410. The cloud computing services 2410 can comprise various types of cloud computing resources, such as computer servers, data storage repositories, networking resources, etc. The cloud computing services 2410 can be centrally located (e.g., provided by a data center of a business or organization) or distributed (e.g., provided by various computing resources located at different locations, such as different data centers and/or located in different cities or countries).

The cloud computing services 2410 can be utilized by various types of computing devices (e.g., client computing devices), such as computing devices 2420, 2422, and 2424. For example, the computing devices (e.g., 2420, 2422, and 2424) can be computers (e.g., desktop or laptop computers), mobile devices (e.g., tablet computers or smart phones), or other types of computing devices. For example, the computing devices (e.g., 2420, 2422, and 2424) can utilize the cloud computing services 2410 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Embodiments

Any of the following example clauses can be implemented.

Clause 1. A computer-implemented method comprising: receiving a prompt query entered through a user interface; detecting sensitive data in the prompt query that violates a security protocol; generating a modified prompt query which anonymizes the sensitive data; submitting the modified prompt query to a large language model; receiving a reply generated by the large language model, wherein the reply contains anonymized sensitive data; generating a modified reply which deanonymizes the anonymized sensitive data; and presenting the modified reply on the user interface.

Clause 2. The method of clause 1, wherein generating the modified prompt query comprises: hashing the sensitive data using a hash algorithm to convert one or more pieces of the sensitive data into one or more unique hash values; and replacing the one or more pieces of the sensitive data in the prompt query with the one or more unique hash values. [hashing]

Clause 3. The method of clause 2, further comprising persisting a mapping between the one or more pieces of the sensitive data and the one or more unique hash values in a local storage.

Clause 4. The method of clause 3, wherein the anonymized sensitive data in the reply comprises the one or more unique hash values, wherein generating the modified reply comprises replacing the one or more unique hash values in the reply with the one or more pieces of the sensitive data based on the mapping persisted in the local storage.

Clause 5. The method of any one of clauses 1-4, wherein generating the modified prompt query comprises combining the prompt query with a context query, wherein the context query is configured to instruct the large language model to generate a script written in a specified programming language in the reply.

Clause 6. The method of clause 5, wherein generating the modified reply comprises executing the script generated by the large language model.

Clause 7. The method of any one of clauses 5-6, wherein the context query is configured to instruct the large language model to conclude the script with a return statement, which is configured to return a data structure containing computed information based on content of the prompted query.

Clause 8. The method of clause 7, wherein the script is written in JavaScript and the data structure is a JSON structure.

Clause 9. The method of any one of clauses 5-8, wherein the context query is configured to instruct the large language model to use anonymized sensitive data contained in the modified prompt query in the script.

Clause 10. The method of any one of clauses 5-9, wherein the context query is configured to instruct the large language model that the generated script is not enclosed within a named function so that the script is directly executable in a global scope.

Clause 11. A computing system comprising: memory; one or more hardware processors coupled to the memory; and one or more computer readable storage media storing instructions that, when loaded into the memory, cause the one or more hardware processors to perform operations comprising: receiving a prompt query entered through a user interface; detecting sensitive data in the prompt query that violates a security protocol; generating a modified prompt query which anonymizes the sensitive data; submitting the modified prompt query to a large language model; receiving a reply generated by the large language model, wherein the reply contains anonymized sensitive data; generating a modified reply which deanonymizes the anonymized sensitive data; and presenting the modified reply on the user interface.

Clause 12. The system of clause 11, wherein generating the modified prompt query comprises: hashing the sensitive data using a hash algorithm to convert one or more pieces of the sensitive data into one or more unique hash values; and replacing the one or more pieces of the sensitive data in the prompt query with the one or more unique hash values.

Clause 13. The system of clause 12, wherein the operations further comprise persisting a mapping between the one or more pieces of the sensitive data and the one or more unique hash values in a local storage.

Clause 14. The system of clause 13, wherein the anonymized sensitive data in the reply comprises the one or more unique hash values, wherein generating the modified reply comprises replacing the one or more unique hash values in the reply with the one or more pieces of the sensitive data based on the mapping persisted in the local storage.

Clause 15. The system of any one of clauses 11-14, wherein generating the modified prompt query comprises combining the prompt query with a context query, wherein the context query is configured to instruct the large language model to generate a script written in a specified programming language in the reply.

Clause 16. The system of clause 15, wherein generating the modified reply comprises executing the script generated by the large language model.

Clause 17. The system of any one of clauses 15-16, wherein the context query is configured to instruct the large language model to conclude the script with a return statement, which is configured to return a data structure containing computed information based on content of the prompted query.

Clause 18. The system of any one of clauses 15-17, wherein the context query is configured to instruct the large language model to use anonymized sensitive data contained in the modified prompt query in the script.

Clause 19. The system of any one of clauses 15-18, wherein the context query is configured to instruct the large language model that the generated script is not enclosed within a named function so that the script is directly executable in a global scope.

Clause 20. One or more non-transitory computer-readable media having encoded thereon computer-executable instructions causing one or more processors to perform a method, the method comprising: receiving a prompt query entered through a user interface; detecting sensitive data in the prompt query that violates a security protocol; generating a modified prompt query which anonymizes the sensitive data; submitting the modified prompt query to a large language model; receiving a reply generated by the large language model, wherein the reply contains anonymized sensitive data; generating a modified reply which deanonymizes the anonymized sensitive data; and presenting the modified reply on the user interface, wherein generating the modified prompt query comprises combining the prompt query with a context query, wherein the context query is configured to instruct the large language model to generate a script written in a specified programming language in the reply.

EXAMPLE ALTERNATIVES

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
receiving a prompt query entered through a user interface;
detecting sensitive data in the prompt query that violates a security protocol;
generating a modified prompt query which anonymizes the sensitive data;
submitting the modified prompt query to a large language model;
receiving a reply generated by the large language model, wherein the reply contains anonymized sensitive data;
generating a modified reply which deanonymizes the anonymized sensitive data; and
presenting the modified reply on the user interface,
wherein generating the modified prompt query comprises combining the prompt query with a context query, wherein the context query is configured to explicitly instruct the large language model to utilize only the anonymized sensitive data contained in the modified prompt query without replacements.

2. The method of claim 1, wherein generating the modified prompt query comprises:
hashing the sensitive data using a hash algorithm to convert one or more pieces of the sensitive data into one or more unique hash values; and
replacing the one or more pieces of the sensitive data in the prompt query with the one or more unique hash values.

3. The method of claim 2, further comprising persisting a mapping between the one or more pieces of the sensitive data and the one or more unique hash values in a local storage.

4. The method of claim 3, wherein the anonymized sensitive data in the reply comprises the one or more unique hash values, wherein generating the modified reply comprises replacing the one or more unique hash values in the reply with the one or more pieces of the sensitive data based on the mapping persisted in the local storage.

5. The method of claim 1, wherein the context query is configured to instruct the large language model to generate a script written in a specified programming language in the reply.

6. The method of claim 1, wherein generating the modified reply comprises executing the script generated by the large language model.

7. The method of claim 1, wherein the context query is configured to instruct the large language model to conclude the script with a return statement, which is configured to return a data structure containing computed information based on content of the prompted query.

8. The method of claim 7, wherein the script is written in JavaScript and the data structure is a JSON structure.

9. The method of claim 5, wherein the script includes on or more arithmetic or logistic operations that are configured to be executed to produce computed results based on the anonymized sensitive data.

10. The method of claim 1, wherein the context query is configured to instruct the large language model that the generated script is not enclosed within a named function so that the script is directly executable in a global scope.

11. A computing system comprising:
memory;
one or more hardware processors coupled to the memory; and
one or more computer readable storage media storing instructions that, when loaded into the memory, cause the one or more hardware processors to perform operations comprising:

receiving a prompt query entered through a user interface;
detecting sensitive data in the prompt query that violates a security protocol;
generating a modified prompt query which anonymizes the sensitive data;
submitting the modified prompt query to a large language model;
receiving a reply generated by the large language model, wherein the reply contains anonymized sensitive data;
generating a modified reply which deanonymizes the anonymized sensitive data; and
presenting the modified reply on the user interface,
wherein generating the modified prompt query comprises combining the prompt query with a context query, wherein the context query is configured to explicitly instruct the large language model to utilize only the anonymized sensitive data contained in the modified prompt query without replacements.

12. The system of claim 11, wherein generating the modified prompt query comprises:
hashing the sensitive data using a hash algorithm to convert one or more pieces of the sensitive data into one or more unique hash values; and
replacing the one or more pieces of the sensitive data in the prompt query with the one or more unique hash values.

13. The system of claim 12, wherein the operations further comprise persisting a mapping between the one or more pieces of the sensitive data and the one or more unique hash values in a local storage.

14. The system of claim 13, wherein the anonymized sensitive data in the reply comprises the one or more unique hash values, wherein generating the modified reply comprises replacing the one or more unique hash values in the reply with the one or more pieces of the sensitive data based on the mapping persisted in the local storage.

15. The system of claim 11, wherein the context query is configured to instruct the large language model to generate a script written in a specified programming language in the reply.

16. The system of claim 11, wherein generating the modified reply comprises executing the script generated by the large language model.

17. The system of claim 11, wherein the context query is configured to instruct the large language model to conclude the script with a return statement, which is configured to return a data structure containing computed information based on content of the prompted query.

18. The system of claim 15, wherein the script includes on or more arithmetic or logistic operations that are configured to be executed to produce computed results based on the anonymized sensitive data.

19. The system of claim 11, wherein the context query is configured to instruct the large language model that the generated script is not enclosed within a named function so that the script is directly executable in a global scope.

20. One or more non-transitory computer-readable media having encoded thereon computer-executable instructions causing one or more processors to perform a method, the method comprising:
receiving a prompt query entered through a user interface;
detecting sensitive data in the prompt query that violates a security protocol;
generating a modified prompt query which anonymizes the sensitive data;
submitting the modified prompt query to a large language model;
receiving a reply generated by the large language model, wherein the reply contains anonymized sensitive data;
generating a modified reply which deanonymizes the anonymized sensitive data; and
presenting the modified reply on the user interface,
wherein generating the modified prompt query comprises combining the prompt query with a context query, wherein the context query is configured to explicitly instruct the large language model to utilize only the anonymized sensitive data contained in the modified prompt query without replacements.

* * * * *